United States Patent
Agarwal et al.

(10) Patent No.: US 6,524,435 B1
(45) Date of Patent: Feb. 25, 2003

(54) METHOD AND COMPOSITION FOR DISPERSING HYDROPHOBIC PARTICLES IN AQUEOUS SUSPENSIONS

(75) Inventors: Sameer B. Agarwal, Glendale Heights, IL (US); Phillip W. Carter, Naperville, IL (US); Martin J. Coffey, Wheaton, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/566,874

(22) Filed: May 8, 2000

(51) Int. Cl.[7] ............... C08L 73/01; D21C 3/20; D21C 5/02
(52) U.S. Cl. ............... 162/1; 106/203.2; 162/5; 162/55; 162/77
(58) Field of Search ............... 106/203.2; 162/5, 162/55, 77, 1

(56) References Cited

FOREIGN PATENT DOCUMENTS

| DE | 4420591 | * 12/1995 | ............ B01D/19/04 |
|---|---|---|---|
| WO | WO 98/55692 | * 12/1998 | ............ D21H/11/00 |

OTHER PUBLICATIONS

"Modifying Surface Properties Of Sticky Materials Through Polymer/Surfactant Adsorption", T.F. Ling, Pulp and Paper Canada, 94:10, 17–23, (1993).

Pluronic® & Tetronic® Surfactants, BASF Performance Chemicals, BASF Corporation (1996).

* cited by examiner

*Primary Examiner*—David W. Wu
*Assistant Examiner*—Kelechi C. Egwim
(74) *Attorney, Agent, or Firm*—Michael B. Martin; Thomas M. Breininger

(57) ABSTRACT

A method of dispersing hydrophobic particles in aqueous suspensions comprising adding to the suspension an effective amount of an ethylene oxide-propylene oxide block copolymer, wherein the copolymer has a molecular weight of from about 1,000 to about 50,000 and a HLB of from about 1 to about 4 and compositions comprising the ethylene oxide-propylene oxide block copolymer.

6 Claims, No Drawings

METHOD AND COMPOSITION FOR DISPERSING HYDROPHOBIC PARTICLES IN AQUEOUS SUSPENSIONS

TECHNICAL FIELD

This invention is directed to a method of dispersing hydrophobic particles in aqueous suspensions using ethylene oxide-propylene oxide block copolymers and to aqueous compositions comprising the ethylene oxide-propylene oxide block copolymers.

BACKGROUND OF THE INVENTION

The deposition of organic contaminants on process equipment, screens, and containment vessels in papermaking significantly reduces process efficiency and paper quality. Deposits on machine wires, felts, foils, headbox surfaces, screens, and instruments require costly downtime for cleaning to avoid the problems associated with poor process control, reduced throughput, and substandard sheet properties. These contaminants are generically referred to in the paper industry as either "pitch" or "stickies".

Pitch deposits generally originate from natural resins (fatty acids, rosin acids, sterols, etc), resin salts, coating binders, or sizing agents found in the pulp (Journal of Pulp and Paper Science, 22:11,431–439, 1996). Pitch may also contain inorganic materials such as talc, calcium carbonate, or titanium dioxide. Stickies generally refers to the hydrophobic substances used in the manufacture of paper such as pressure sensitive or contact adhesives such as styrene butadiene rubber, hot melt adhesives such as ethylene vinyl acetate and thermoplastics inks (styrene acrylate, polyvinyl butyral) that can form deposits when reintroduced in recycled fiber systems. Other common hydrophobic contaminants found in recycle applications include wax, which originates primarily from wax-coated old corrugated containers, and polyisoprene.

Recycled fiber refers to secondary fibers which are repulped to provide the papermaking furnish with raw material for the production of new papers. The secondary fibers may be either pre-consumer or post-consumer paper material that is suitable for use in the production of paper products. Sources of secondary fiber may include old newspaper (ONP), old corrugated containers (OCC), mixed office waste (MOW), computer printout (CPO), ledger, etc. These once-processed papers contain various types of adhesives (pressure sensitive, hot melts, etc.), inks, and coating binders. Coating binders can include the so-called 'white pitch' associated with the repulping of polyvinyl acetate and styrene butadiene coated broke.

Pitch and stickies are hydrophobic in nature and thus quite unstable as colloids in aqueous papermaking environments, thereby facilitating their deposition. The major problems arising from deposition are as follows: (1) reduced throughput due to plugging of forming fabrics and press felts (2) sheet holes or paper breaks due to large deposits breaking loose from the equipment, and (3) reduced sheet quality due to contaminants incorporated in the final sheet.

To deal with the problem of stickies, a number of strategies have been employed by papermakers. These strategies include mechanical and chemical means to either remove or detackify the contaminants. Mechanical means of removing the contaminants include slotted pressure screens, hydrocyclones, and cleaners of various types. Also, thermal/mechanical dispersion units are employed to break the contaminants into micron sized particles, which are then difficult to detect in the final sheet. Despite these techniques 100% removal of contaminants by mechanical means cannot be accomplished.

Chemically, several approaches are taken, including passivation or detackification of the sticky contaminant surfaces. Detackification means the process of reducing the rate of detrimental deposits originating from pitch or stickies. Dispersing is one route of detackification that improves the colloidal stability of contaminant particles in aqueous systems. Common detackification agents include inorganic materials such as talc and zirconium compounds, and organic materials such as polyvinyl alcohol. In addition, various dispersants may be used to prevent the contaminants from agglomerating. The small, dispersed contaminants may be fixed to the paper sheet by the use of cationic polymers. Finally, if the contaminant problem becomes severe, solvents may be used to wash and remove the materials from machine surfaces and clothing.

Previous studies show that a variety of nonionic or anionic polymer/surfactant types can be effective in reducing the surface tension, adhesion tension, and contact angles of aqueous solutions in contact with a polyester surface (Pulp and Paper Canada, 94:10, 17–23, (1993)). These studies, however, relate to the deposition tendency of hydrophobic particles onto surfaces rather than dispersancy of the stickies in aqueous environments.

Similar peel test data has been used extensively to demonstrate the detackification properties of chemical additives such as polyalkylene oxide/vinyl acetate copolymers (U.S. Pat. No. 5,266,166), terphthalate gycol terpolymers (U.S. Pat. No. 5,415,739), methyl cellulose derivatives (U.S. Pat. No. 4,781,794), and polyvinyl alcohol (U.S. Pat. No. 4,956,051).

Peel test data has also been used to show that polyelectrolyte complexes comprised of oppositely charged materials are also useful detackification agents (TAPPI Journal, 81:6, 143–151, (1998), U.S. Pat. No. 5,292,403). While the peel test data has meaningful applications in the paper industry, it fails to accurately predict the relative adhesion properties between aqueous hydrophobic particles in the presence of chemical additives.

More recently, atomic force microscopy (AFM) has been developed as a tool for measuring the microscopic adhesion forces between hydrophobic particles of colloidal dimension in aqueous solutions (J. Colloid and Interface Sci., 185, 363–370, (1997)). This technique has even been applied to adhesion forces between hydrophobic particles and paper (TAPPI J., 82:5, 172–174, (1999)). The AFM measurements are a much better simulation of interparticle collisions in aqueous solution than the peel tester. The industrial standard peel tester applies forces of ~800 $kN/m^2$ over ~100 $cm^2$ for 2 minutes compared to the 5 $kN/m^2$ forces applied over ~30 $\mu m^2$ for milliseconds in AFM measurements. The surface preparation, applied forces, surface areas, and adhesion times are vastly different, with the AFM protocol more closely resembling interparticle collisions in all aspects. Therefore, AFM results will have greater applicability to aqueous dispersancy of hydrophobic particles than the peel tester data, which may have greater applicability in dryer section deposition problems.

International Patent Application No. PCT/US98/05261 discloses a method of removing pitch and stickies from papermaking fiber comprising treating the fiber with a composition comprising ethylene oxide-propylene oxide block copolymers, an organic solvent and a surfactant and then mechanically separating the agglomerated stickies and pitch from the papermaking fiber.

A method of dispersing wax during the recycling of coated paper products using a plasticizer and an ethylene-oxide/propylene oxide block copolymer is disclosed in commonly-assigned Ser. Nos. 09/039,863 and 09/258,627.

SUMMARY OF THE INVENTION

Using AFM adhesion force measurements, we unexpectedly discovered a series of block copolymers of ethylene oxide and propylene oxide (EO/PO block copolymers) that significantly outperform the traditional industry standard chemical treatment programs for detackification.

Although the surface activity of EO/PO block copolymers has been previously reported via contact angle and surface tension measurements, (Pulp and Paper Canada, 94:10, 17–23, (1993)) their effectiveness in reducing adhesion forces between hydrophobic particles in aqueous medium has never been demonstrated until now. This property is extremely valuable for aiding in the dispersion of hydrophobic particle contaminants in recycled paper applications.

Thus, the EO/PO block copolymers described herein are highly effective and efficient additives for dispersing hydrophobic particles in aqueous suspensions. The addition of EO/PO block copolymers to process waters in recycled fiber papermaking applications improves papermaking efficiencies by reducing deposits originating from pitch or stickies.

Accordingly, in its principal embodiment, this invention is directed to a method of dispersing hydrophobic particles in aqueous suspensions comprising adding to the suspension an effective amount of an ethylene oxide-propylene oxide block copolymer, wherein the copolymer has a molecular weight of from about 1,000 to about 50,000 and a HLB of from about 1 to about 4.

DETAILED DESCRIPTION OF THE INVENTION

The EO-PO block copolymers of this invention consist of repeating ethylene oxide (EO) and propylene oxide (PO) polymer blocks and have a HLB of from about 1 to about 4. These low-HLB EO/PO block copolymers are widely known and commercially available from a variety of sources for use as defoaming and antifoaming agents in a number of applications. See "PLURONIC® & TETRONIC® Surfactants", BASF Performance Chemicals, BASF Corporation, 1996.

The EO/PO block copolymers of this invention have formulas 1–4 below where a–v are independently integers of from 1 to about 1000 such that EO/PO block copolymer has a molecular weight of from about 1,000 to about 50,000.

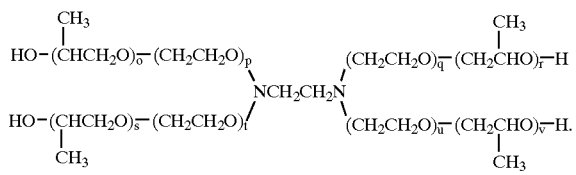

EO/PO block copolymers of formula (1)–(4) are also referred to as EO/PO/EO block copolymers, PO/EO/PO block copolymers, EO/PO/EO branched, block copolymers, and PO/EO/PO branched, block copolymers, respectively.

In a preferred aspect of this invention, the ethylene oxide-propylene oxide block copolymer comprises from about 10 percent to about 80% ethylene oxide units by weight and has a molecular weight of from about 2,000 to about 20,000.

In another preferred aspect, the ethylene oxide-propylene oxide block copolymer comprises about 10 percent ethylene oxide units by weight and has a molecular weight of about 3800 and a HLB of about 1.

In another preferred aspect, the EO-PO block copolymer is added to a papermaking slurry.

In another preferred aspect, the papermaking slurry comprises recycled fiber.

In another preferred aspect, this invention is directed to an aqueous composition comprising an ethylene oxide-propylene oxide block copolymer and one or more surfactants wherein the ethylene oxide-propylene oxide block copolymer has a molecular weight of from about 1,000 to about 50,000 and a HLB of from about 1 to about 4 and the surfactant has a HLB greater than about 18.

The surfactant is added to solubilize the EO-PO block copolymer in water. Generally any surfactant having a HLB greater than 18 is suitable. Representative surfactants include non-ionic surfactants such as alcohol ethoxylates (e.g. Tergitol® 15-S-40, available from Union Carbide Corp., Danbury, Conn.), anionic surfactants such as TEA dodecylbenzene sulfonate (e.g. Norfox T-60, available from Norman, Fox and Co., Vernon, Calif.), sodium lauryl sulfate (e.g. Rhodapon LSB, available from Rhône-Poulenc, North American Chem. Surfactants and Specialties, Cranburry, N.J.), and the like, and cationic surfactants such as a fatty quaternary ammonium derivatives (e.g. Atlas G-265, available from ICI Surfactants, Wilmington, Del.).

When acidic surfactants such as dodecylbenzenesulfonic acid are used, the composition may contain additives such as triethanolamine, sodium hydroxide, and the like to adjust the pH of the composition. In a preferred aspect, the aqueous composition as a pH of about 7.

Additional medium HLB surfactants (e.g. ethoxylated alcohols having a HLB range from 7–15) may be added to increase the HLB range of the composition. Additional surfactants may also be included in the composition to address issues of foaming (e.g. silicon based surfactants, sorbitan oleates, glycerol oleates, etc.) These additional surfactants are typically added at a concentration of up to 10 percent.

In another preferred aspect, the weight ratio of ethylene oxide-propylene oxide block copolymer to surfactant is from about 5:1 to about 1:1.

In another preferred aspect, the surfactant is sodium dodecylbenzenesulfonate.

In another preferred aspect, the weight ratio of ethylene oxide-propylene oxide block copolymer to surfactant is about 1:1.

In another preferred aspect, this invention is directed to a method of dispersing hydrophobic particles in aqueous suspensions comprising adding to the suspension an effective amount of an aqueous composition comprising an ethylene oxide-propylene oxide block copolymer and one or more surfactants wherein the ethylene oxide-propylene oxide block copolymer has a molecular weight of from about 1,000 to about 50,000 and a HLB of from about 1 to about 4 and the surfactant has a HLB greater than about 18.

In another preferred aspect, the aqueous suspension is a papermaking slurry.

The EO-PO block copolymer may be added at any point in the wet end of the papermaking process where "wet end" means the parts of the papermaking process occurring before the final press and dryer section. Preferably the EO-PO block copolymer is added to the papermaking slurry at a location that allows intimate contact between the chemical treatment and the paper stock, e.g. pulper, machine chest, refiners, etc. The dosage of the product will depend on the level of hydrophobic contaminants present in the fiber stock. The dosage is usually in the range of 0.05%–1% based on dry fiber.

The foregoing may be better understood by reference to the following examples, which are presented for purposes of illustration and are not intended to limit the scope of this invention.

In the following examples, the following terms and designations have the following meanings.

"Surface tension", ($\gamma$), is the force per unit area at every interface (air-solid, air-liquid, and solid-liquid). When the shape of an interface is changed, the Work required to deform the interface can be defined in terms of the terms of the surface tension (Work=$\gamma$dA)

"Adhesion force" is the maximum force required to separate surfaces in contact under the conditions of either the peel tester or AFM measurements.

"Composition A" (L101, BASF, Mt. Olive, N.J.) is an EO/PO/EO block copolymer that has a HLB of about 1, a molecular weight of about 3800 and contains about 10 percent polyoxyethylene by weight.

"Composition B" is an aqueous composition comprising the EO/PO/EO block copolymer of composition A and sodium dodecylbenzenesulfonate in a 1:1 ratio by weight.

"Composition C" is sodium dodecylbenzenesulfonate (pH adjusted to 7.5–9 with sodium hydroxide).

"Composition D" is 20% polymer actives ethoxylated akanolamide (N-8683, available from Nalco Chemical Company, Naperville, Ill.), representative of a current composition used for dispersing pitch and stickies.

"Composition E" is 9% polymer actives polyvinyl alcohol (Detac™ 8523 (available from Hercules Inc., Jacksonville, Fla.), representative of another composition currently used for dispersing pitch and stickies.

"Composition F" is 99.3 percent hydrolyzed polyvinyl alcohol, M.W. 85,000–146,000, 9% solids (available from Aldrich Chemical Company, Inc., Milwaukee, Wis.).

"Composition G" is talc, a magnesium silicate mineral.

"Composition H" is a PO/EO/PO block copolymer having a HLB of about 1 and a molecular weight of about 3250 (31R1, available from BASF, Mt. Olive, N.J.).

"Composition I" is a EO/PO/EO branched, block copolymer having a HLB of about 2 and a molecular weight of about 6800 (1301, available from BASF, Mt. Olive, N.J.).

"Composition J" is a PO/EO/PO branched, block copolymer having a HLB of about 1 and a molecular weight of about 8000 (150R1, available from BASF, Mt. Olive, N.J.).

"Composition K" is a EO-PO-EO block copolymer having a HLB of about 3 and a molecular weight of about 2000 (L61, available from BASF, Mt. Olive, N.J.).

"Composition L" is a EO-PO-EO branched, block copolymer having a HLB of about 1 and a molecular weight of about 4400 (L121, available from BASF, Mt. Olive, N.J.).

"PMMA" means poly(methylmethacrylate).

"PVA" means poly(vinylalcohol).

"NaDBSA" means sodium dodecylbenzylsulfonic acid.

EXAMPLE 1

Surface force measurements are made using a commercially available atomic force microscope (Dimension 3100, Digital Instruments, Santa Barbara, Calif.). With this instrument, the forces between a 10 to 15 $\mu$m PMMA bead and a hydrophobic surface are recorded as a function of their separation distance. The details of the instrument have been published elsewhere (Nordic Pulp and Paper Res. Journal, 14(1), 30–36 (1999)). Cantilever force constants are determined by a previously reported procedure (Rev. Sci. Instrum., 64, 403–405, (1993)). The data presented in subsequent examples are collected using cantilevers with a length of about 100 $\mu$m, having a measured force constant of 0.40 N/m. Adhesion forces are extracted from the force-distance curves by measuring the maximum negative force value on the retraction curve prior to tip spring-back.

Data acquisition is done in force calibration mode, and is typically performed using an acquisition rate of 1 Hz, a sample data set size of 512 points, and a total scan size of about 2 microns.

The hydrophobic wax surface is prepared by a spin coating technique where approximately 0.3 mL of a 1 wt. % wax in hexane solution is dropped onto a glass cover slip spinning at 4500 rpm. The cover slipped is air-dried and glued onto a magnetic disc for mounting in the AFM. PMMA (Bangs Laboratories, Fishers, Ind.) are glued to tipless DNP-type cantilevers (Digital Instruments, Santa Barbara, Calif.) using a five-minute epoxy resin possessing 2,4,6-tri(dimethylaminomethyl) phenol as the crosslinking agent. The cantilevers with attached PMMA spheres are rinsed with isopropyl alcohol and deionized water just prior to the force measurement experiments.

An aqueous solution with a volume of 200–500 $\mu$L is sufficient to "wet" the entire solution cell and about 1 $cm^2$ of the hydrophobic surface area below it. The solutions are buffered around pH=9 and the measurements are made in the presence of additives at the concentrations indicated in the tables below.

Table 1 shows the dosage dependent behavior for the various treatment programs in reducing the adhesive forces between the model wax substrate and PMMA sphere. Composition A produces a 77% reduction in the hydrophobic adhesion forces even at dosages as low as 2 ppm. At 5 ppm, composition A has reduced the adhesion forces by 99%. This is significantly better than all other treatment programs examined. Only talc (composition G) at 50 ppm could reduce the adhesion forces as effectively as composition A at 5 ppm. This means that composition A is the most preferred additive for preventing adhesive collisions between hydrophobic particles in aqueous solutions. The NaDBSA additive (composition C) alone had very little effect on reducing the adhesion forces, and composition B preformed similarly to composition A.

TABLE 1

AFM adhesion data - Wax substrate and PMMA sphere tip*

| product conc. (ppm) | actives conc. (ppm) | App. Force (mN/m) | Avg Adhesion (mN/m) | Reduction in Adhesion/ Force (%) |
|---|---|---|---|---|
| A |  |  |  |  |
| 0 | 0 | 12.1 | 46.7 | 0.0 |
| 2 | 2 | 13.79 | 10.53 | 77.4 |
| 5 | 5 | 12.24 | 0.46 | 99.0 |
| 10 | 10 | 10.16 | 0 | 100.0 |
| B |  |  |  |  |
| 0 | 0 | 4.257 | 18.29 | 0.0 |
| 27 | 4 | 10–16 | 9.7 | 52.8 |
| 50 | 7.5 | 4.285 | 0.54 | 97.0 |
| C |  |  |  |  |
| 0 | 0 | 10–16 | 15.9 | 0.0 |
| 8 | 8 | 10–16 | 15.4 | 3.1 |
| D |  |  |  |  |
| 0 | 0 | 5.5 | 66.95 | 0.0 |
| 10 | 2 | 6.97 | 65.11 | 2.7 |
| 25 | 5 | 7.02 | 60.43 | 9.7 |
| 50 | 10 | 8.66 | 22.63 | 66.2 |
| E |  |  |  |  |
| 0 | 0 | 5.3 | 33.55 | 0.0 |
| 22 | 1.98 | 3.16 | 31.45 | 6.3 |
| 55 | 4.95 | 3.86 | 23.04 | 31.3 |
| 110 | 9.9 | 4.76 | 15.7 | 53.2 |
| F |  |  |  |  |
| 0 | 0 | 10.84 | 48.55 | 0.0 |
| 22 | 1.98 | 9.13 | 53.8 | −10.8 |
| 55 | 4.95 | 8.93 | 52.4 | −7.9 |
| 110 | 9.9 | 10.85 | 6.9 | 85.8 |
| G |  |  |  |  |
| 0 | 0 | 9.02 | 39.51 | 0.0 |
| 20 | 20 | 10.31 | 32.76 | 17.1 |
| 50 | 50 | 9.75 | 0.21 | 99.5 |

*tip radius approximately 10 microns

EXAMPLE 2

Table 2 shows a similar trend in the reduction of adhesion forces between a hydrophobic sphere (PMMA) and a model polyisoprene hydrophobic surface. At 5 ppm composition A produces a 98% reduction in the adhesion forces. No other treatment program could achieve a 60% reduction in adhesion even at higher dosages.

TABLE 2

AFM adhesion data-Polyisoprene surface and PMMA sphere tip

| product conc. (ppm) | actives conc. (ppm) | Avg. Force (mN/m) | Avg Adhesion (mN/m) | Redn in Adhesion/ Force (%) |
|---|---|---|---|---|
| A |  |  |  |  |
| 0 | 0 | 10.52 | 53.57 | 0.00 |
| 2 | 2 | 12.45 | 16.84 | 68.6 |
| 5 | 5 | 12.42 | 0.96 | 98.2 |
| 10 | 10 | 11.7 | 4.46 | 91.7 |
| D |  |  |  |  |
| 0 | 0 | 8.8 | 48.19 | 0.00 |
| 10 | 2 | 8.51 | 21.05 | 56.3 |
| 25 | 5 | 3.62 | 28.06 | 41.8 |
| 50 | 10 | 4.64 | 39.99 | 17.0 |
| E |  |  |  |  |
| 0 | 0 | 14.36 | 39.12 | 0.00 |
| 22 | 1.98 | 16.39 | 39.21 | −0.2 |
| 55 | 4.95 | 15.54 | 35.66 | 8.8 |
| 110 | 9.9 | 15.76 | 35.85 | 8.4 |
| F |  |  |  |  |
| 0 | 0 | 22.49 | 57.25 | 0.00 |
| 22 | 1.98 | 20 | 36.84 | 35.7 |
| 55 | 4.95 | 22.19 | 43.77 | 23.5 |
| 110 | 9.9 | 24.33 | 58.5 | −2.2 |
| G |  |  |  |  |
| 0 | 0 | 10.56 | 35.27 | 0.00 |
| 20 | 20 | 10.77 | 32.89 | 6.7 |
| 50 | 50 | 14.09 | 38.98 | −10.5 |

*radius approximately 10 microns

EXAMPLE 3

Detackification of model hydrophobic surfaces by different EO/PO block copolymers is tested using the AFM. The results are shown in Table 3. The results in Table 3 show that irrespective of molecular conformations, the EO/PO copolymers which have sufficiently low HLB show good detackification because of their affinity for the hydrophobic surfaces.

TABLE 3

AFM Adhesion Data for Representative EO/PO Block Copolymers (Polyisoprene surface and PMMA sphere tip)

| Composition | Concn. (ppm) | HLB | Mol. wt | Applied Force (mN/m) | Max. Adhesion (mN/m) | Percent Reduction in Adhesion (compared to blank) |
|---|---|---|---|---|---|---|
| H | 5 | 1 | 3250 | 9.30 | 4.95 | 85.35 |
| I | 5 | 2 | 6800 | 9.24 | 2.68 | 92.67 |
| J | 5 | 1 | 8000 | 10.71 | 0.99 | 97.49 |
| A | 5 | 1 | 3800 | 10.51 | 0.78 | 97.98 |
| K | 5 | 3 | 2000 | 11.56 | 27.58 | 40.60 |
| L | 5 | 1 | 4400 | 11.84 | 7.97 | 83.26 |
| A | 5 | 1 | 3800 | 11.68 | 5.68 | 88.07 |

What is claimed is:
1. A method of dispersing hydrophobic particles in a papermaking slurry containing fiber, said method consisting essentially of adding to the slurry about 0.05 to about 1 weight percent, based on weight of dry fiber, of an ethylene oxide-propylene oxide block copolymer, wherein the copolymer has a molecular weight of from about 1,000 to about 50,000 and a HLB of from about 1 to about 4, and wherein the ethylene oxide-propylene oxide block copolymer has formula (1) or (2)

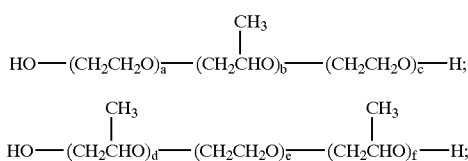

wherein a–f are independently integers of from 1 to about 1000 such that the EO/PO block copolymer has a molecular weight of from about 1,000 to about 50,000.

2. The method of claim 1 wherein the ethylene oxide-propylene oxide block copolymer comprises from about 10 percent to about 80% ethylene oxide units by weight and has a molecular weight of from about 2,000 to about 20,000.

3. The method of claim 2 wherein the ethylene oxide-propylene oxide block copolymer comprises about 10 percent ethylene oxide units by weight and has a molecular weight of about 3800 and a HLB of about 1.

4. The method of claim 1 wherein the papermaking slurry comprises recycled fiber.

5. A method of dispersing hydrophobic particles in a papermaking slurry containing fiber, said method consisting essentially of adding to the slurry about 0.05 to about 1 weight percent, based on weight of dry fiber, of an aqueous composition comprising an ethylene oxide-propylene oxide block copolymer and one or more surfactants in an amount sufficient to solubilize the ethylene oxide-propylene block copolymer, wherein the ethylene oxide-propylene oxide block copolymer has a molecular weight of from about 1,000 to about 50,000 and a HLB of from about 1 to about 4 and the surfactant has a HLB greater than about 18, and wherein the ethylene oxide-propylene oxide block copolymer has formula (1) or (2)

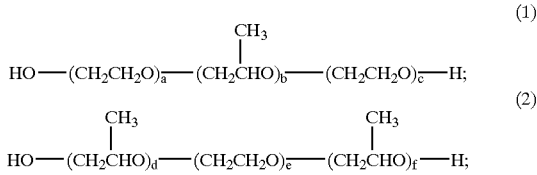

wherein a–f are independently integers of from 1 to about 1000 such that the EO/PO block copolymer has a molecular weight of from about 1,000 to about 50,000.

6. The method of claim 5 wherein the papermaking slurry comprises recycled fiber.

* * * * *